(12) United States Patent
Do et al.

(10) Patent No.: US 12,095,370 B2
(45) Date of Patent: Sep. 17, 2024

(54) DC-DC CONVERTER FOR DISPLAY PANEL CAPABLE OF REDUCING AREA OCCUPIED BY VOLTAGE-TO-CURRENT CONVERTER

(71) Applicant: LX SEMICON CO., LTD., Daejeon (KR)

(72) Inventors: Xuan Dien Do, Daejeon (KR); Yoon Soo Shin, Daejeon (KR); Chang Jin Jeong, Daejeon (KR); Jin Su Byeon, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

(21) Appl. No.: 18/147,885

(22) Filed: Dec. 29, 2022

(65) Prior Publication Data
US 2023/0216406 A1     Jul. 6, 2023

(30) Foreign Application Priority Data
Dec. 30, 2021    (KR) .................. 10-2021-0192952

(51) Int. Cl.
*G09G 3/36*      (2006.01)
*H02M 1/00*      (2006.01)
*H02M 3/158*      (2006.01)

(52) U.S. Cl.
CPC .......... *H02M 3/158* (2013.01); *G09G 3/3696* (2013.01); *H02M 1/0009* (2021.05); *H02M 1/0032* (2021.05); *G09G 2330/021* (2013.01)

(58) Field of Classification Search
CPC ...... G09G 3/36; G09G 3/3611; G09G 3/3614; G09G 3/3622; G09G 3/3625; G09G 3/364; G09G 3/3648; G09G 3/3666; G09G 3/3674; G09G 3/3677; G09G 3/3681; G09G 3/3685; G09G 3/3688; G09G 3/3692;
(Continued)

(56) References Cited

U.S. PATENT DOCUMENTS

| 8,830,159 B2 * | 9/2014 | Liu ........................ G09G 3/342 |
| | | 345/82 |
| 2008/0175029 A1 * | 7/2008 | Jung ..................... H02M 3/156 |
| | | 363/79 |

(Continued)

FOREIGN PATENT DOCUMENTS

| KR | 10-1353893 B1 | 1/2014 |
| KR | 10-1593605 B1 | 2/2016 |

*Primary Examiner* — Ke Xiao
*Assistant Examiner* — Nelson Lam
(74) *Attorney, Agent, or Firm* — Greenberg Traurig, LLP

(57) ABSTRACT

According to one embodiment of the present disclosure, there is provided a DC-DC converter including a slope compensation circuit configured to generate a sawtooth-shaped compensation ramp wave to output a slope voltage, a current sensing circuit configured to receive and convert a sensing current to output the converted current, and an adder configured to receive the slope voltage and the sensing current, wherein the adder includes a sensing resistor and a sensing switch, one end of the sensing resistor is connected to the current sensing circuit and the other end of the sensing resistor is connected to the sensing switch and the slope compensation circuit, and one end of the sensing switch is connected to the sensing resistor and the slope compensation circuit and the other end of the sensing switch is connected to the ground.

14 Claims, 7 Drawing Sheets

(58) Field of Classification Search
CPC ........... G09G 3/3696; G09G 2330/021; G09G 2330/028; H02M 1/0009; H02M 1/0012
USPC .................................................. 345/87–104
See application file for complete search history.

(56) References Cited

U.S. PATENT DOCUMENTS

| | | | |
|---|---|---|---|
| 2009/0273325 A1* | 11/2009 | Nakahashi | H02M 3/156 323/282 |
| 2010/0066328 A1* | 3/2010 | Shimizu | H02M 3/1588 323/282 |
| 2013/0314062 A1* | 11/2013 | Notman | H02M 3/1588 323/271 |
| 2014/0203792 A1* | 7/2014 | Miyamae | G05F 1/461 323/282 |
| 2014/0347345 A1* | 11/2014 | Yoshizawa | G09G 3/3406 345/99 |
| 2015/0022172 A1* | 1/2015 | Hari | H02M 3/156 323/282 |
| 2015/0381039 A1* | 12/2015 | Hari | H02M 1/15 323/271 |
| 2016/0006336 A1* | 1/2016 | Bennett | H02M 3/156 323/271 |
| 2017/0163162 A1* | 6/2017 | Chang | H02M 3/33523 |
| 2019/0097535 A1* | 3/2019 | Otsuka | H02M 1/08 |

\* cited by examiner

DC-DC CONVERTER FOR DISPLAY PANEL CAPABLE OF REDUCING AREA OCCUPIED BY VOLTAGE-TO-CURRENT CONVERTER

CROSS-REFERENCE TO RELATED APPLICATIONS

This application claims the benefit of the Korean Patent Applications No. 10-2021-0192952 filed on Dec. 30, 2021, which are hereby incorporated by reference as if fully set forth herein.

FIELD

The present disclosure relates to a DC-DC converter and a display panel driving apparatus including the same.

BACKGROUND

A liquid crystal display (LCD) using a liquid crystal and an organic light emitting diode (OLED) display using an organic light emitting diode are typical display devices for displaying images.

An apparatus for driving such display devices may include an adder and a DC-DC converter including the adder.

SUMMARY

The present disclosure is directed to providing a DC-DC converter and a display panel driving apparatus including the same, capable of reducing an area occupied by a voltage-to-current converter, and saving power consumed by the voltage-to-current converter to reduce power consumption by eliminating the voltage-to-current converter.

A DC-DC converter according to one embodiment of the present disclosure includes a slope compensation circuit configured to generate a sawtooth-shaped compensation ramp wave to output a slope voltage, a current sensing circuit configured to receive and convert a sensing current to output the converted current, and an adder configured to receive the slope voltage and the sensing current, wherein the adder includes a sensing resistor and a sensing switch, one end of the sensing resistor is connected to the current sensing circuit and the other end of the sensing resistor is connected to the sensing switch and the slope compensation circuit, and one end of the sensing switch is connected to the sensing resistor and the slope compensation circuit and the other end of the sensing switch is connected to the ground.

According to a DC-DC converter and a display panel driving apparatus including the DC-DC converter of the present disclosure, it is possible to reduce an area occupied by a voltage-to-current converter, and save power consumed by the voltage-to-current converter to reduce power consumption by eliminating the voltage-to-current converter.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
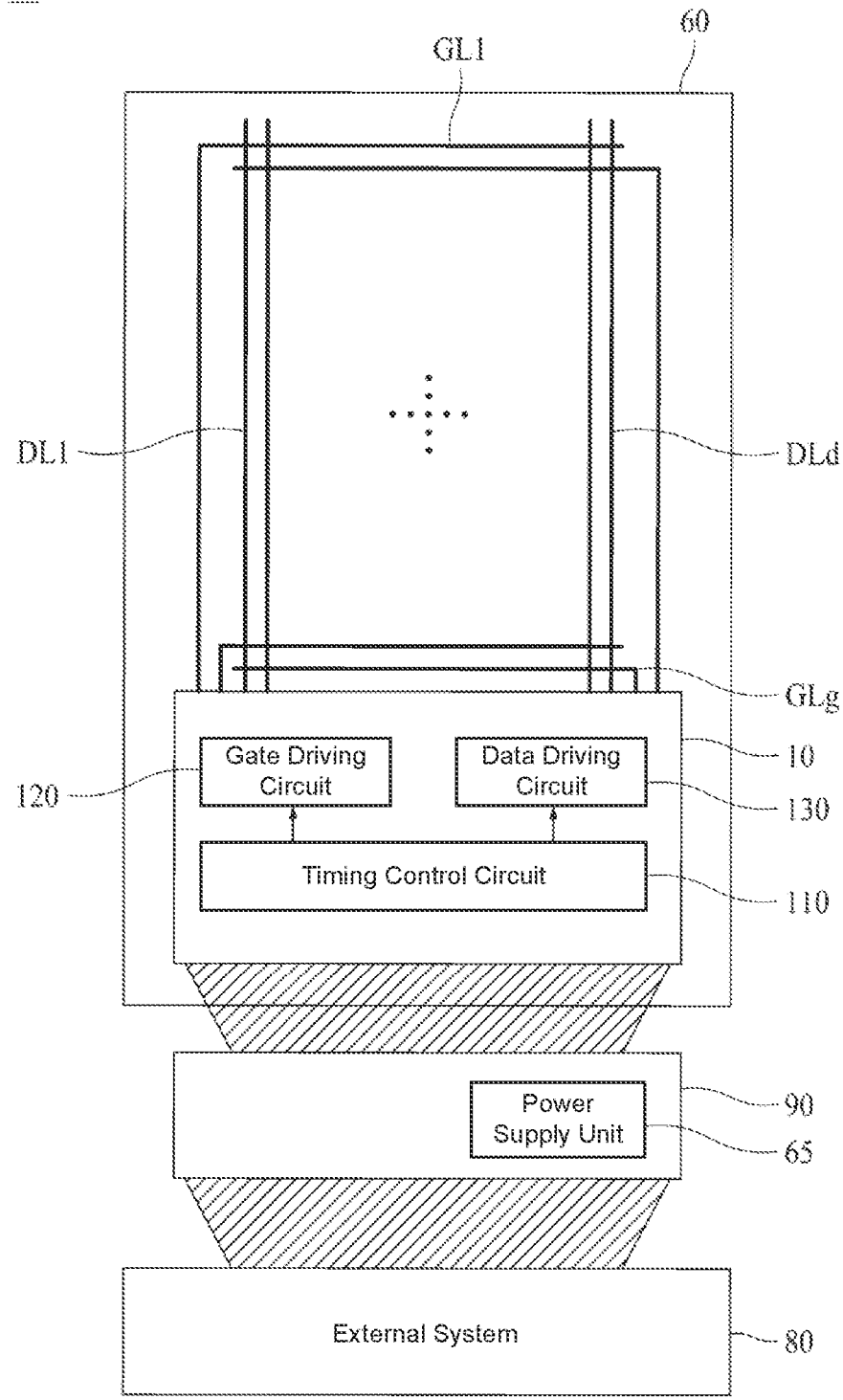
FIG. 1 is a diagram illustrating a display device including a DC-DC converter according to one embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display device including a display panel driving apparatus according to one embodiment of the present disclosure will be described in detail with reference to FIG. 1. FIG. 1 is a diagram illustrating the display device to which the display panel driving apparatus according to one embodiment of the present disclosure is applied.

A display device 50 according to the present disclosure may include a display panel 60, a power supply unit 65, and an external system 80. In addition, the display device 50 according to the present disclosure may include a display panel driving apparatus 10.

The display panel 60 may be an organic light emitting panel in which an organic light emitting device is formed or a liquid crystal panel in which a liquid crystal is formed. That is, the display panel 60 applied to the present disclosure may be any type of currently used panel. Accordingly, the display device according to the present disclosure may also be an organic light emitting display device, a liquid crystal display device, and various other display devices. However, hereinafter, for convenience of description, the liquid crystal display device will be described as an example of the present disclosure.

When the display panel 60 is a liquid crystal panel, a plurality of data lines DL1 to DLd, a plurality of gate lines GL1 to GLg crossing the data lines, a plurality of thin film transistors (TFTs) formed at intersections of the data lines and the gate lines, a plurality of pixel electrodes for charging a data voltage to pixels, and a common electrode for driving a liquid crystal filled in a liquid crystal layer together with the pixel electrodes may be formed on a lower glass substrate of the display panel 60, and the pixels may be arranged in a matrix form due to the intersecting structure of the data lines and the gate lines.

A black matrix (BM) and a color filter may be formed on an upper glass substrate of the display panel 60. A liquid crystal may be filled between the lower glass substrate and the upper glass substrate.

A liquid crystal mode of the display panel 60 applied to the present disclosure may be any type of liquid crystal mode as well as a TN mode, a VA mode, an IPS mode, and an FFS mode. Furthermore, the display device 50 according to the present disclosure may be implemented in any form such as a transmissive liquid crystal display device, a transflective liquid crystal display device, or a reflective liquid crystal display device.

The display panel 60 may display an image in response to a gate signal and a source signal output from the display panel driving apparatus 10.

The display panel driving apparatus 10 may include the power supply unit 65, a timing control circuit 110 for controlling a gate driving circuit 120 and a data driving circuit 130 formed on the display panel 60, the gate driving circuit 120 for controlling signals input to the gate lines, and the data driving circuit 130 for controlling signals input to the data lines.

In addition, the display panel driving apparatus 10 may include a DC-DC converter according to one embodiment of the present disclosure in order to supply power for driving the display panel 60 or generate the signals input to the gate lines and the data lines.

The power supply unit 65 may be mounted on a main board 90 to supply a voltage for driving the display panel 60, the display panel driving apparatus 10, and the external system 80. In this case, various circuit elements in addition to the power supply unit 65 may be mounted on the main board 90.

The power supply unit 65 may generate a voltage according to a driving voltage of each of the circuits included in the display panel driving apparatus 10 and supply the voltage to each of the circuits.

The power supply unit 65 may supply power for driving the display panel 60 to the display panel 60 so that the display panel 60 may be able to operate.

In addition, the power supply unit 65 may include the DC-DC converter according to one embodiment of the present disclosure.

At this time, in FIG. 1, the display panel driving apparatus 10 is illustrated as being mounted on the display panel 60, but the present disclosure is not limited thereto. For example, the display panel driving apparatus 10 may be mounted on a separate board separated from the display panel 60.

Furthermore, as shown in FIG. 1, the timing control circuit 110, the gate driving circuit 120, and the data driving circuit 130 constituting the display panel driving apparatus 10 may be configured as a single chip package or may be separately disposed.

The gate driving circuit 120 and the data driving circuit 130 may include the DC-DC converter according to one embodiment of the present disclosure.

A DC-DC converter according to one embodiment of the present disclosure will be described in detail with reference to FIG. 2, which is a circuit diagram of the DC-DC converter according to one embodiment of the present disclosure.

The DC-DC converter according to one embodiment of the present disclosure may include a power stage 200 and a current mode controller 300.

The power stage 200 may include an inductor and a circuit for charging or discharging energy to the inductor. In addition, the power stage 200 may include a circuit including at least one of a P-channel MOS transistor, an N-channel MOS transistor, and a capacitor to control the energy charged into the inductor or the energy discharged from the inductor.

The current mode controller 300 may include a logic controller 310, a comparator 320, an error amplifier 330, a slope compensation circuit 340, a current sensing circuit 350, and an adder 360.

The logic controller 310 may be connected to one end of the inductor and form a path for charging or discharging energy to the inductor by controlling a DC voltage supplied from an input terminal Vin.

In addition, the logic controller 310 may be capable of controlling a sensing current input switch (not shown) positioned between the current sensing circuit 350 and the logic controller 310 to prevent a sensing current Isense output from the inductor from being output to the current sensing circuit 350.

The comparator 320 may compare a detected voltage output from the error amplifier 330 with a voltage value of a slope-compensated sensing voltage Vadd, which is input from the adder 360, to output a control signal to the logic controller 310 when the voltage value of the slope-compensated sensing voltage Vadd exceeds the detected voltage.

The error amplifier 330 may output an error signal by comparing an output voltage VOUT of the power stage 200 with a predetermined reference voltage Vref. Alternatively, although not shown, the output voltage VOUT of the power stage 200 may input an output voltage divided by a voltage divider to the error amplifier 330 to output the error signal by comparing the divided output voltage with the reference voltage Vref.

The slope compensation circuit 340 may generate a sawtooth-shaped compensation ramp wave (a voltage waveform that is linearly changed sequentially by a slope), and output the wave to the input terminal of the adder 360.

Figure 2:
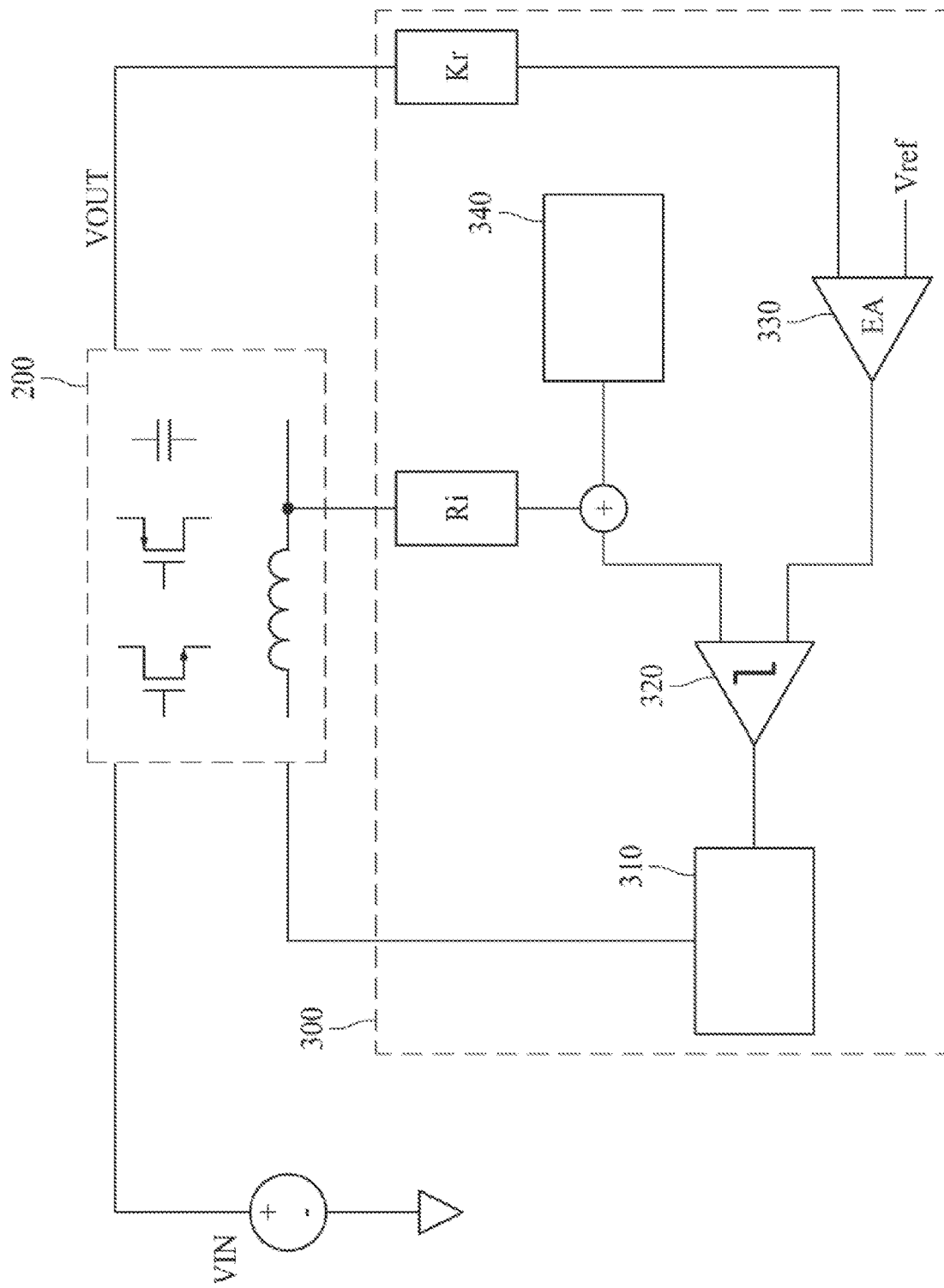
FIG. 2 is a circuit diagram of the DC-DC converter according to one embodiment of the present disclosure.

Although not shown in FIG. 2, the current sensing circuit 350 may be a circuit that detects a current value of the sensing current output from the inductor L. The current sensing circuit 350 may convert the sensing current Isense output from the inductor L and output a converted current $K_L*I_L$ to the adder 360. To this end, the current sensing circuit 350 may include a plurality of N-channel transistors M5 and M6 and a plurality of P-channel transistors M3 and M4.

The adder 360 may perform slope compensation on a sensing voltage Vcs using a slope voltage Vs, which is a voltage of the compensation ramp wave output from the slope compensation circuit 340. In particular, since the output voltage VOUT of the power stage 200 may change in response to a change in the current flowing through the inductor, with respect to the slope voltage Vs, which is the voltage of the compensation ramp wave for the slope compensation, the adder 360 may calculate the sensing voltage Vcs corresponding to the change in the current output from the inductor and feedback the compensation ramp wave.

That is, the adder 360 may add the slope voltage Vs output from the slope compensation circuit 340 and the sensing voltage Vcs output from the current sensing circuit 350 as described above. Accordingly, the adder 360 may perform slope compensation for the sensing voltage Vcs corresponding to the current flowing through the inductor using the slope voltage Vs and output the sensing voltage Vcs to the comparator 320.

Hereinafter, an adder according to one embodiment of the present disclosure will be described in detail with reference to FIG. 3, which is a circuit diagram of an adder, a slope compensation circuit, and a current sensing circuit according to one embodiment of the present disclosure.

Figure 3:
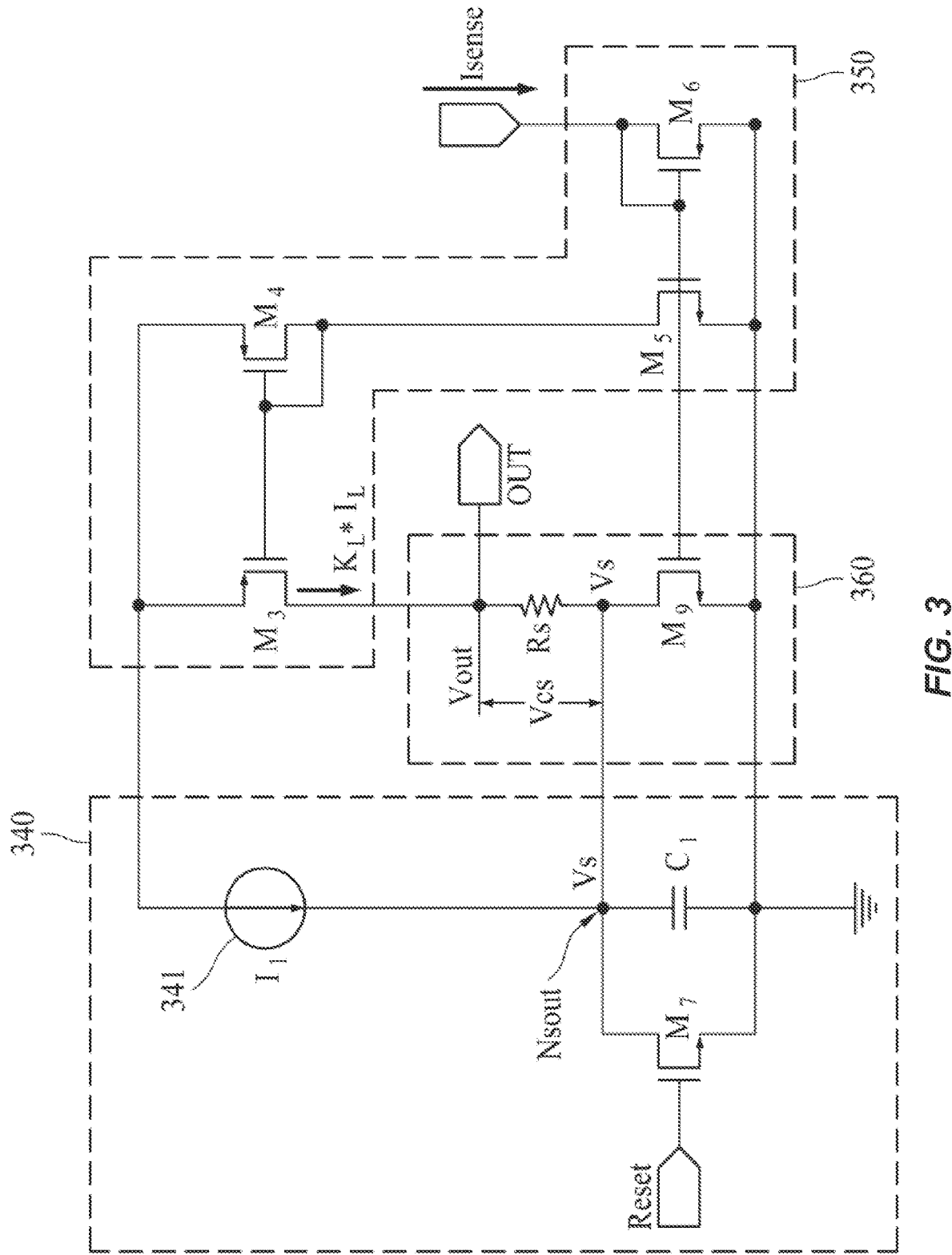
FIG. 3 is a circuit diagram of an adder, a slope compensation circuit, and a current sensing circuit according to one embodiment of the present disclosure.

Referring to FIG. 3, the slope compensation circuit 340 may include a constant current supply 341, a reset switch M7, and a capacitor C1. In the slope compensation circuit 340, according to a reset signal input to the reset switch M7, the capacitor C1 may be charged by a constant current $I_1$ to generate a sawtooth-shaped compensation ramp wave, and the slope voltage Vs, which is the voltage of the compensation ramp wave, may be output.

The adder 360 may add the slope voltage Vs output from the slope compensation circuit 340 and the sensing voltage Vcs output from the current sensing circuit 350 as described above. To this end, the adder 360 may include a sensing resistor Rs and a sensing switch M9, and the sensing switch M9 may be an N-channel transistor.

Particularly, the adder 360 according to one embodiment of the present disclosure may be implemented in a simpler circuit structure without a voltage-current conversion circuit, thereby reducing power consumed by the voltage-current conversion circuit and an area occupied by the voltage-current conversion circuit in a DC-DC converter.

One end of the sensing resistor Rs may be connected to the current sensing circuit 350 and the other end thereof may be connected to the slope compensation circuit 340 and the sensing switch M9, and one end of the sensing switch M9 of the adder 360 may be connected to an output terminal Nsout of the slope compensation circuit 340 and the sensing resistor Rs and the other end thereof may be connected to the ground. According to one embodiment of the present disclosure, the other end of the sensing switch M9 of the adder 360 may be connected to the ground and, therefore, the current $K_L*I_L$ converted from the sensing current Isense by the current sensing circuit 350 may flow through the sensing resistor Rs, so that the sensing voltage Vcs may be applied to both ends of the sensing resistor Rs. In other words, the sensing voltage Vcs corresponding to the sensing current Isense may be applied to the sensing resistor Rs. In this case, the sensing voltage Vcs may have a voltage value according to Equation 1.

$$Vcs = Rs*K_L*I_L \qquad \text{[Equation 1]}$$

Accordingly, as shown in Equation 2, slope compensation may be performed on the sensing voltage Vcs applied to the sensing resistor Rs and thus a voltage in an output terminal OUT of the adder 360 may be a voltage value obtained by adding the sensing voltage Vcs or $Rs*K_L*I_L$ applied to the sensing resistor Rs to the slope voltage Vs applied to the other end of the sensing resistor Rs.

$$Vout = Vs + Rs*K_L*I_L \qquad \text{[Equation 2]}$$

Figure 4:
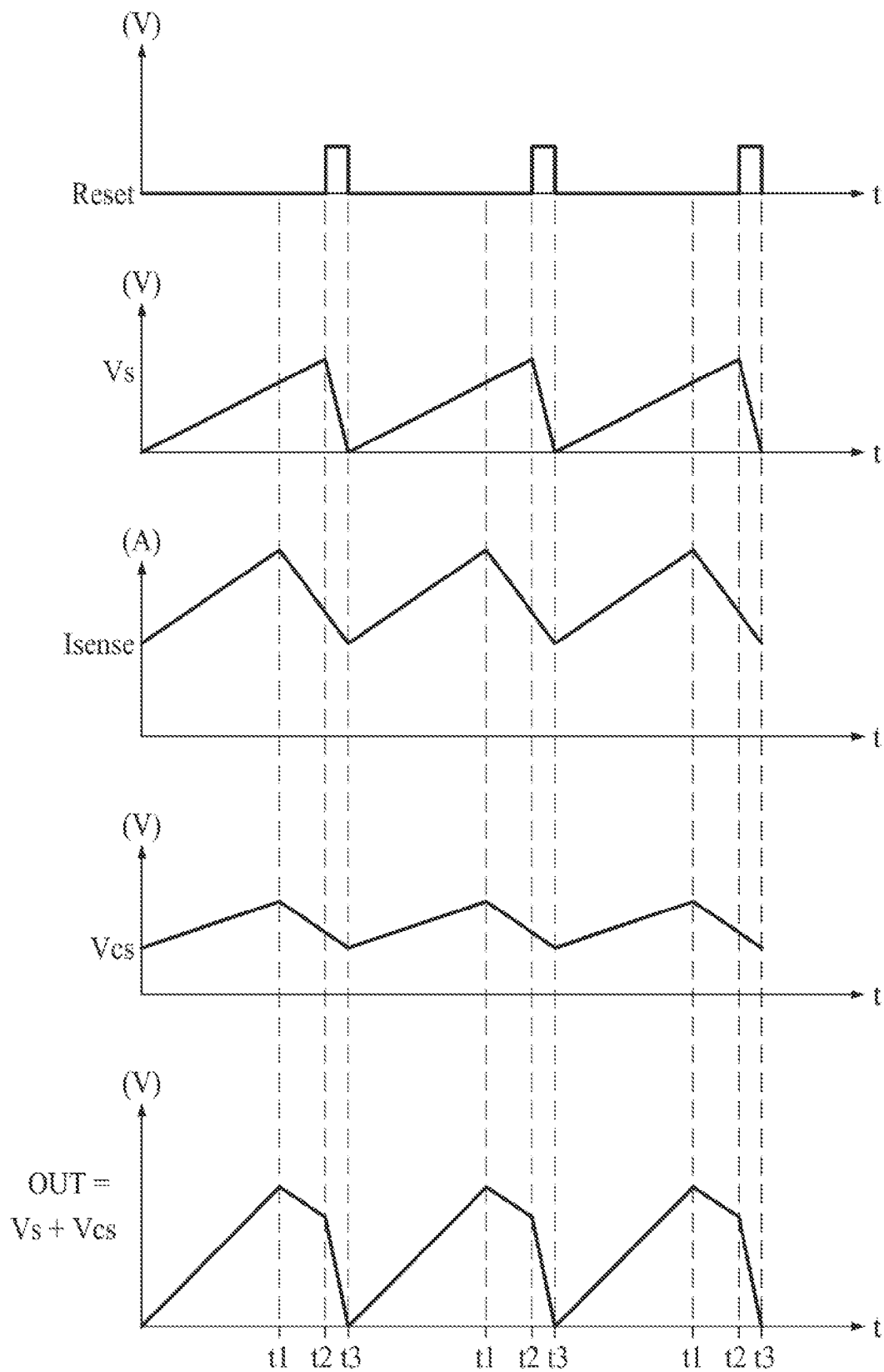
FIG. 4 is a signal timing diagram of the adder, the slope compensation circuit, and the current sensing circuit according to one embodiment of the present disclosure.

Hereinafter, operations of an adder, a slope compensation circuit, and a current sensing circuit according to one embodiment of the present disclosure will be described in detail with reference to FIGS. 4 to 5B. FIG. 4 is a signal timing diagram of the adder, the slope compensation circuit, and the current sensing circuit according to one embodiment of the present disclosure, and FIGS. 5A and 5B are diagrams illustrating the circuit operation of the adder according to one embodiment of the present disclosure.

Figure 5A:
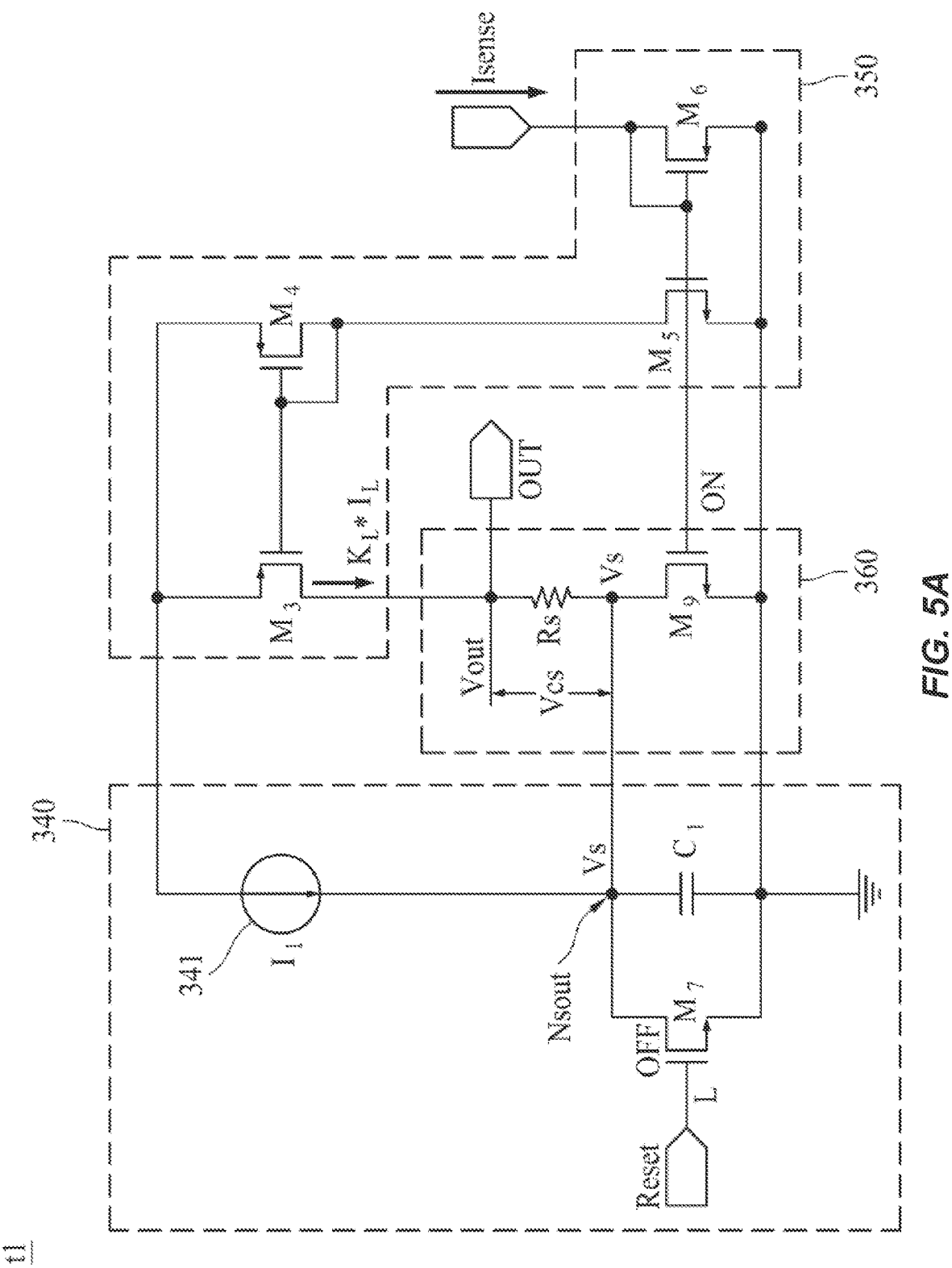
FIGS. 5A and 5B are diagrams illustrating the circuit operation of the adder, the slope compensation circuit, and the current sensing circuit according to one embodiment of the present disclosure.

As shown in FIGS. 4 and 5A, when a low-level signal L is input to a reset switch M7 of the slope compensation circuit 340 (t1), the reset switch M7 may be turned off, and a capacitor C1 may be charged by a constant current $I_1$ so that a slope voltage Vs may be applied to both ends of the capacitor C1. As a result, the slope voltage Vs of a compensation ramp wave may be output to an output node Nsout of the slope compensation circuit 340. At the same time, as a sensing current Isense by an inductor is input to a sensing switch M9 of the adder 360, the sensing switch M9 of the adder 360 may be turned on, and the aforementioned slope voltage Vs may be applied to one end of the sensing switch M9 and the other end thereof may be connected to the ground. As a result, the sensing current Isense by the inductor may be input to the current sensing circuit 350 and may be converted by a plurality of N-channel transistors M5 and M6 and a plurality of P-channel transistors M3 and M4, and the converted current $K_L*I_L$ may flow through a sensing resistor Rs of the adder 360.

Figure 5B:
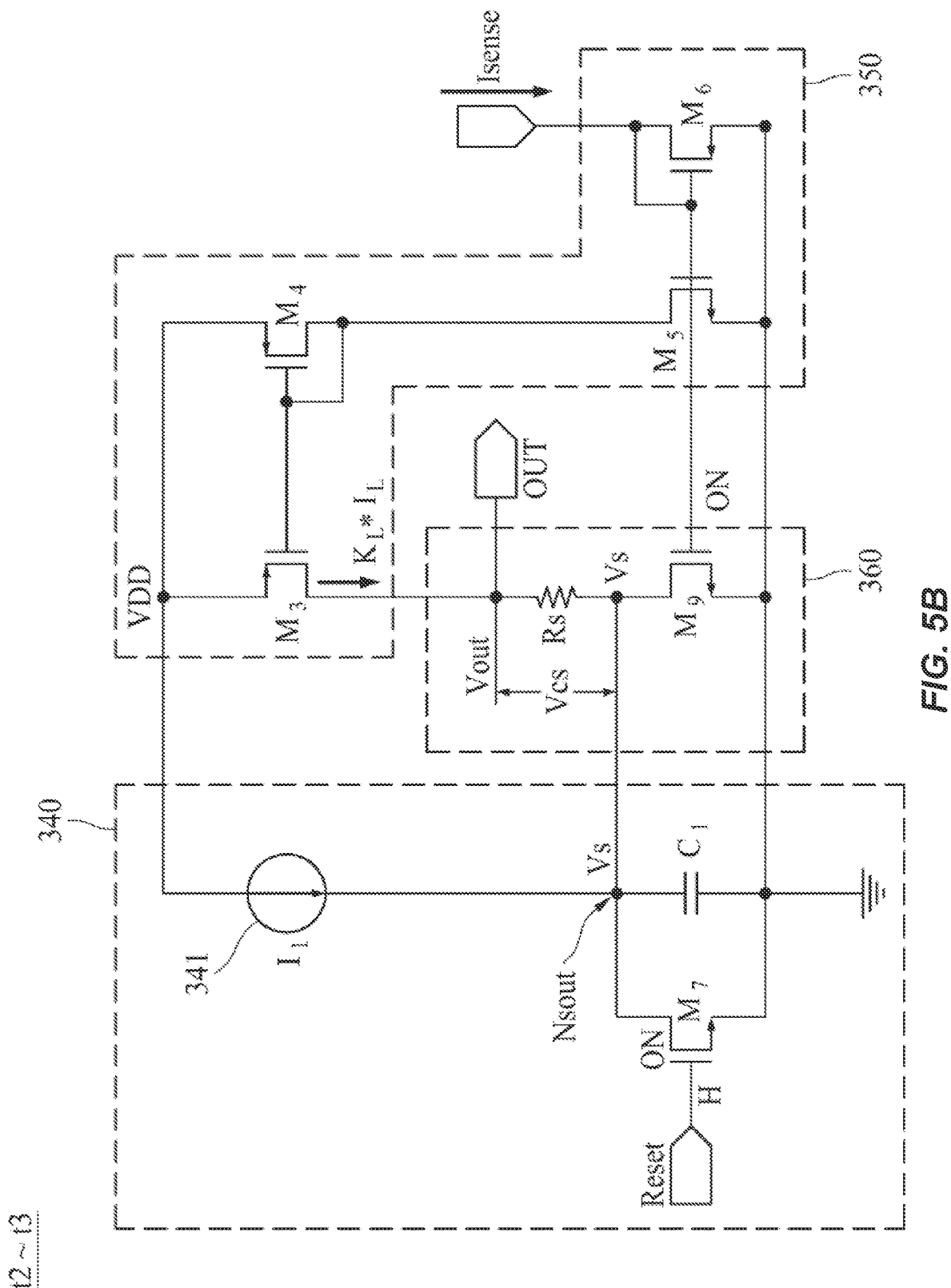

As shown in FIGS. 4 and 5B, while a high-level signal H is input as a reset signal to the reset switch M7 of the slope compensation circuit 340 (t2 to t3), the reset switch M7 may be turned on and the charged capacitor C1 may be discharged by the reset switch M7 so that the slope voltage Vs applied to both ends of the capacitor C1 may decrease. As a result, the slope voltage Vs output to the output node Nsout of the slope compensation circuit 340 may decrease. At the same time, as the sensing current Isense by the inductor is input to the sensing switch M9 of the adder 360, the sensing switch M9 of the adder 360 may be turned on, and the above-mentioned slope voltage Vs may be applied to one end of the sensing switch M9 of the adder 360 and the other end thereof may be connected to the ground. As a result, the sensing current Isense by the inductor may be input to the current sensing circuit 350 and may be converted by the plurality of N-channel transistors M5 and M6 and the plurality of P-channel transistors M3 and M4, and the converted current $K_L*I_L$ may flow through the sensing resistor Rs of the adder 360.

The DC-DC converter according to one embodiment of the present disclosure may be capable of outputting a current output from the inductor to the adder both when energy is charged in the inductor and when the energy charged in the inductor is discharged. Although not shown, to this end, the sensing switch for controlling the connection between the inductor and the current sensing circuit 350 may be located therebetween and the aforementioned logic controller 310 may be capable of outputting a connection signal to the sensing switch to connect the inductor and the current sensing circuit 350 both when energy is charged in the inductor and when the energy charged in the inductor is discharged.

When a voltage is applied to an input terminal of the inductor, energy is charged in the inductor and the sensing current Isense increases. On the other hand, when no voltage is applied to the inductor, the sensing current Isense may decrease as the energy charged in the inductor is discharged.

According to one embodiment of the present disclosure, the sensing current Isense output from the inductor may be input to the adder 360 both when energy is charged in the inductor and when the energy charged in the inductor is discharged. As a result, as shown in FIG. 4, a current corresponding to the sensing current Isense may flow through the sensing resistor Rs of the adder 360 to apply a sensing voltage Vcs.

Figure 6:
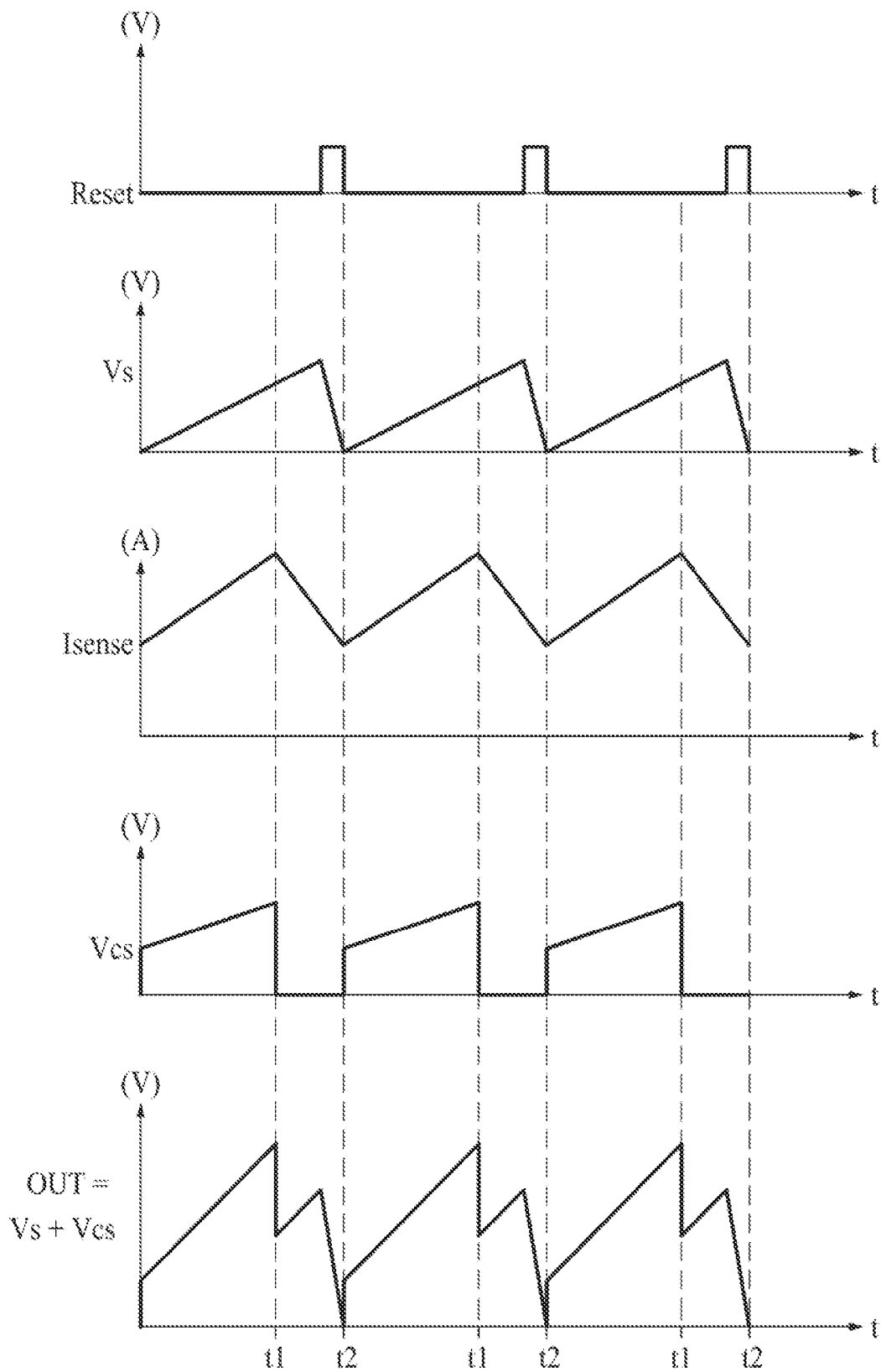
FIG. 6 is a signal timing diagram of an adder, a slope compensation circuit, and a current sensing circuit according to another embodiment of the present disclosure.

Hereinafter, operation of an adder according to another embodiment of the present disclosure will be described in detail with reference to FIG. 6, which is a signal timing diagram of the adder according to another embodiment of the present disclosure.

A DC-DC converter according to another embodiment of the present disclosure may output a current output from an inductor to the adder when energy is charged in the inductor, and may not output the current output from the inductor to the adder when the energy charged in the inductor is discharged. For this purpose, although not shown, as described above, the sensing switch for controlling the connection between the inductor and the current sensing circuit 350 may be located therebetween, and the above-mentioned logic controller 310 may output a connection signal to the sensing switch to connect the inductor and the current sensing circuit 350 when energy is charged in the inductor, while the logic controller may output a connection-blocking signal to the sensing switch so as not to connect the inductor and the current sensing circuit 350 when the energy charged in the inductor is discharged.

When a voltage is applied to the inductor, energy is charged in the inductor and the sensing current Isense increases. In contrast, when no voltage is applied to the inductor, as the connection between the inductor and the current sensing circuit 350 is cut off and the energy charged in the inductor is discharged, the output sensing current Isense may not be transmitted to the current sensing circuit 350.

That is, according to another embodiment of the present disclosure, the sensing current Isense output from the inductor may be input to the adder 360 only when the inductor is charged with energy. Accordingly, as shown in FIG. 6, when the inductor is charged with energy (0 to t1 and t2 to t1), a current corresponding to the sensing current Isense may flow through the sensing resistor Rs of the adder 360 and the sensing voltage Vcs may be applied to the sensing resistor Rs, but when no energy is applied to the inductor and the inductor is discharged (t1 to t2), the current corresponding to the sensing current Isense may not flow through the sensing resistor Rs of the adder 360 so that a voltage value of the sensing voltage Vcs applied to the sensing resistor Rs may be zero.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A DC-DC converter, comprising:
   a slope compensation circuit configured to generate a sawtooth-shaped compensation ramp wave to output a slope voltage;
   a current sensing circuit configured to receive and convert a sensing current to output the converted current; and
   an adder configured to receive the slope voltage and the sensing current,
   wherein the adder includes a sensing resistor and a sensing switch,
   one end of the sensing resistor is connected to the current sensing circuit and another end of the sensing resistor is connected to the sensing switch and the slope compensation circuit, and
   one end of the sensing switch is connected to the sensing resistor and the slope compensation circuit and another end of the sensing switch is connected to a ground,
   wherein the current converted from the sensing current flows through the sensing resistor to apply a sensing voltage, and the slope voltage, which is a voltage of the compensation ramp wave, is applied to one end of the sensing switch so that a voltage obtained by adding the sensing voltage and the slope voltage is applied to one end of the sensing resistor.

2. The DC-DC converter of claim 1, wherein the sensing switch is controlled according to the sensing current.

3. The DC-DC converter of claim 1, wherein the slope compensation circuit includes:
- a constant current input device configured to supply a constant current;
- a reset switch configured to connect circuits according to a reset signal; and
- a capacitor configured to store energy by the constant current, and
- one end of the reset switch is connected to one end of the capacitor and the adder and another end of the reset switch is connected to another end of the capacitor and the ground.

4. The DC-DC converter of claim 3, wherein when the reset switch is turned on, the constant current supplied by the constant current input device flows through the reset switch and the energy stored in the capacitor is discharged so that the voltage applied to both ends of the sensing switch decreases, and
- when the reset switch is turned off, the constant current supplied by the constant current input device flows through the capacitor and the energy stored in the capacitor increases so that the voltage applied to both ends of the sensing switch increases.

5. The DC-DC converter of claim 3, wherein the current sensing circuit includes a plurality of N-channel transistors and a plurality of P-channel transistors, and
- the plurality of N-channel transistors and the plurality of P-channel transistors convert the sensing current and output the converted current.

6. The DC-DC converter of claim 3, further comprising:
- a power stage configured to receive a voltage and output the sensing current;
- the sensing switch positioned between the power stage and the current sensing circuit; and
- a logic controller configured to control the power stage and the sensing switch,
- wherein the logic controller controls the sensing switch to be turned on both when the power stage is charged with energy and when the power stage is discharged.

7. The DC-DC converter of claim 3, further comprising:
- the power stage configured to receive the voltage and output the sensing current;
- the sensing switch positioned between the power stage and the current sensing circuit; and
- the logic controller configured to control the power stage and the sensing switch,
- wherein the logic controller controls the sensing switch to be turned on when the power stage is charged with energy and the sensing switch to be turned off when the power stage is discharged.

8. A display panel driving apparatus, comprising:
- a slope compensation circuit configured to generate a sawtooth-shaped compensation ramp wave to output a slope voltage;
- a current sensing circuit configured to receive and convert a sensing current to output the converted current; and
- an adder configured to receive the slope voltage and the sensing current,
- wherein the adder includes a sensing resistor and a sensing switch,
- one end of the sensing resistor is connected to the current sensing circuit and the other end of the sensing resistor is connected to the sensing switch and the slope compensation circuit, and
- one end of the sensing switch is connected to the sensing resistor and the slope compensation circuit and the other end of the sensing switch is connected to a ground,
- wherein the current converted from the sensing current flows through the sensing resistor to apply a sensing voltage, and the slope voltage, which is a voltage of the compensation ramp wave, is applied to one end of the sensing switch so that a voltage obtained by adding the sensing voltage and the slope voltage is applied to one end of the sensing resistor.

9. The display panel driving apparatus of claim 8, wherein the sensing switch is controlled according to the sensing current.

10. The display panel driving apparatus of claim 8, wherein the slope compensation circuit includes:
- a constant current input device configured to supply a constant current;
- a reset switch configured to connect circuits according to a reset signal; and
- a capacitor configured to store energy by the constant current, and
- one end of the reset switch is connected to one end of the capacitor and the adder and another end of the reset switch is connected to another end of the capacitor and the ground.

11. The display panel driving apparatus of claim 10, wherein when the reset switch is turned on, the constant current supplied by the constant current input device flows through the reset switch and the energy stored in the capacitor is discharged so that the voltage applied to both ends of the sensing switch decreases, and
- when the reset switch is turned off, the constant current supplied by the constant current input device flows through the capacitor and the energy stored in the capacitor increases so that the voltage applied to both ends of the sensing switch increases.

12. The display panel driving apparatus of claim 10, wherein the current sensing circuit includes a plurality of N-channel transistors and a plurality of P-channel transistors, and
- the plurality of N-channel transistors and the plurality of P-channel transistors convert the sensing current and output the converted current.

13. The display panel driving apparatus of claim 10, further comprising:
- a power stage configured to receive a voltage and output the sensing current;
- the sensing switch positioned between the power stage and the current sensing circuit; and
- a logic controller configured to control the power stage and the sensing switch,
- wherein the logic controller controls the sensing switch to be turned on both when the power stage is charged with energy and when the power stage is discharged.

14. The display panel driving apparatus of claim 10, further comprising:
- the power stage configured to receive the voltage and output the sensing current;
- the sensing switch positioned between the power stage and the current sensing circuit; and
- the logic controller configured to control the power stage and the sensing switch,
- wherein the logic controller controls the sensing switch to be turned on when the power stage is charged with energy and the sensing switch to be turned off when the power stage is discharged.

* * * * *